(12) United States Patent
Kretzschmar et al.

(10) Patent No.: US 9,014,905 B1
(45) Date of Patent: Apr. 21, 2015

(54) CYCLIST HAND SIGNAL DETECTION BY AN AUTONOMOUS VEHICLE

(71) Applicant: Google Inc., Mountain View, CA (US)

(72) Inventors: Henrik Kretzschmar, Freiburg (DE); Jiajun Zhu, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/166,502

(22) Filed: Jan. 28, 2014

(51) Int. Cl.
*G05D 1/02* (2006.01)
(52) U.S. Cl.
CPC ..................................... *G05D 1/021* (2013.01)
(58) Field of Classification Search
USPC ............................................................ 701/28
See application file for complete search history.

(56) References Cited

U.S. PATENT DOCUMENTS

| 6,856,906 | B2 * | 2/2005 | Winner et al. | ............... | 701/301 |
| 7,124,027 | B1 * | 10/2006 | Ernst et al. | ................... | 701/301 |
| 8,311,973 | B1 | 11/2012 | Zadeh | | |
| 2011/0246156 | A1 | 10/2011 | Zecha et al. | | |
| 2012/0083960 | A1 * | 4/2012 | Zhu et al. | ...................... | 701/23 |
| 2013/0222127 | A1 | 8/2013 | Avalani | | |

FOREIGN PATENT DOCUMENTS

GB     2421421 A     6/2006

OTHER PUBLICATIONS

Driverless Cars & Dealing With Unexpected Scenarios, DriverlessCarHQ.com, Apr. 24, 2012, U.S.A.

* cited by examiner

*Primary Examiner* — Mary Cheung
*Assistant Examiner* — Anne Mazzara
(74) *Attorney, Agent, or Firm* — McDonnell Boehnen Hulbert & Berghoff LLP

(57) ABSTRACT

Methods and systems for detecting hand signals of a cyclist by an autonomous vehicle are described. An example method may involve a computing device receiving a plurality of data points corresponding to an environment of an autonomous vehicle. The computing device may then determine one or more subsets of data points from the plurality of data points indicative of at least a body region of a cyclist. Further, based on an output of a comparison of the one or more subsets with one or more predetermined sets of cycling signals, the computing device may determine an expected adjustment of one or more of a speed of the cyclist and a direction of movement of the cyclist. Still further, based on the expected adjustment, the computing device may provide instructions to adjust one or more of a speed of the autonomous vehicle and a direction of movement of the autonomous vehicle.

19 Claims, 8 Drawing Sheets

COMPUTER PROGRAM PRODUCT 500

SIGNAL BEARING MEDIUM 501

PROGRAM INSTRUCTIONS 502

- A COMPUTING DEVICE RECEIVING A PLURALITY OF DATA POINTS CORRESPONDING TO AN ENVIRONMENT OF AN AUTONOMOUS VEHICLE

- THE COMPUTING DEVICE DETERMINING ONE OR MORE SUBSETS OF DATA POINTS FROM THE PLURALITY OF DATA POINTS, WHERE THE ONE OR MORE SUBSETS OF DATA POINTS ARE INDICATIVE OF AT LEAST A BODY REGION OF A CYCLIST

- BASED ON AN OUTPUT OF A COMPARISON OF THE ONE OR MORE SUBSETS WITH ONE OR MORE PREDETERMINED SETS OF CYCLING SIGNALS, THE COMPUTING DEVICE DETERMINING AN EXPECTED ADJUSTMENT OF ONE OR MORE OF A SPEED OF THE CYCLIST AND A DIRECTION OF MOVEMENT OF THE CYCLIST

- BASED ON THE EXPECTED ADJUSTMENT, THE COMPUTING DEVICE PROVIDING INSTRUCTIONS TO ADJUST ONE OR MORE OF A SPEED OF THE AUTONOMOUS VEHICLE AND A DIRECTION OF MOVEMENT OF THE AUTONOMOUS VEHICLE

| COMPUTER READABLE MEDIUM 503 | COMPUTER RECORDABLE MEDIUM 504 | COMMUNICATIONS MEDIUM 505 |
|---|---|---|

FIGURE 5

CYCLIST HAND SIGNAL DETECTION BY AN AUTONOMOUS VEHICLE

BACKGROUND

Autonomous vehicles use various computing systems to aid in transporting passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

SUMMARY

The present application discloses embodiments that relate to an autonomous vehicle detecting cyclist hand signals. In one aspect, the present application describes a method. The method may involve a computing device receiving a plurality of data points corresponding to an environment of an autonomous vehicle. The method may also involve the computing device determining one or more subsets of data points from the plurality of data points, where the one or more subsets of data points are indicative of at least a body region of a cyclist. The method may further involve, based on an output of a comparison of the one or more subsets with one or more predetermined sets of cycling signals, the computing device determining an expected adjustment of one or more of a speed of the cyclist and a direction of movement of the cyclist. The method may still further involve, based on the expected adjustment, the computing device providing instructions to adjust one or more of a speed of the autonomous vehicle and a direction of movement of the autonomous vehicle.

In another aspect, the present application describes a non-transitory computer readable medium having stored thereon executable instructions that, upon execution by a computing device, cause the computing device to perform functions. The functions may include receiving a plurality of data points corresponding to an environment of an autonomous vehicle. The functions may also include determining one or more subsets of data points from the plurality of data points, where the one or more subsets of data points are indicative of at least a body region of a cyclist. The functions may further include, based on an output of a comparison of the one or more subsets with one or more predetermined sets of cycling signals, determining an expected adjustment of one or more of a speed of the cyclist and a direction of movement of the cyclist. The functions may still further include, based on the expected adjustment, providing instructions to adjust one or more of a speed of the autonomous vehicle and a direction of movement of the autonomous vehicle.

In still another aspect, the present application describes a system. The system may comprise at least one processor. The system also may comprise a memory having stored thereon instructions that, upon execution by the at least one processor, cause the system to perform functions. The functions may include receiving a plurality of data points corresponding to an environment of an autonomous vehicle. The functions may also include determining one or more subsets of data points from the plurality of data points, where the one or more subsets of data points are indicative of at least a body region of a cyclist. The functions may further include, based on an output of a comparison of the one or more subsets with one or more predetermined sets of cycling signals, determining an expected adjustment of one or more of a speed of the cyclist and a direction of movement of the cyclist. The functions may still further include, based on the expected adjustment, providing instructions to adjust one or more of a speed of the autonomous vehicle and a direction of movement of the autonomous vehicle.

In yet another aspect, a system is provided that includes a means for receiving a plurality of data points corresponding to an environment of an autonomous vehicle. The system further includes a means for determining one or more subsets of data points from the plurality of data points, where the one or more subsets of data points are indicative of at least a body region of a cyclist. The system further includes a means for, based on an output of a comparison of the one or more subsets with one or more predetermined sets of cycling signals, determining an expected adjustment of one or more of a speed of the cyclist and a direction of movement of the cyclist. The system further includes a means for, based on the expected adjustment, providing instructions to adjust one or more of a speed of the autonomous vehicle and a direction of movement of the autonomous vehicle.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 5 is a schematic diagram illustrating a conceptual partial view of an example computer program.

DETAILED DESCRIPTION

Figure 1:
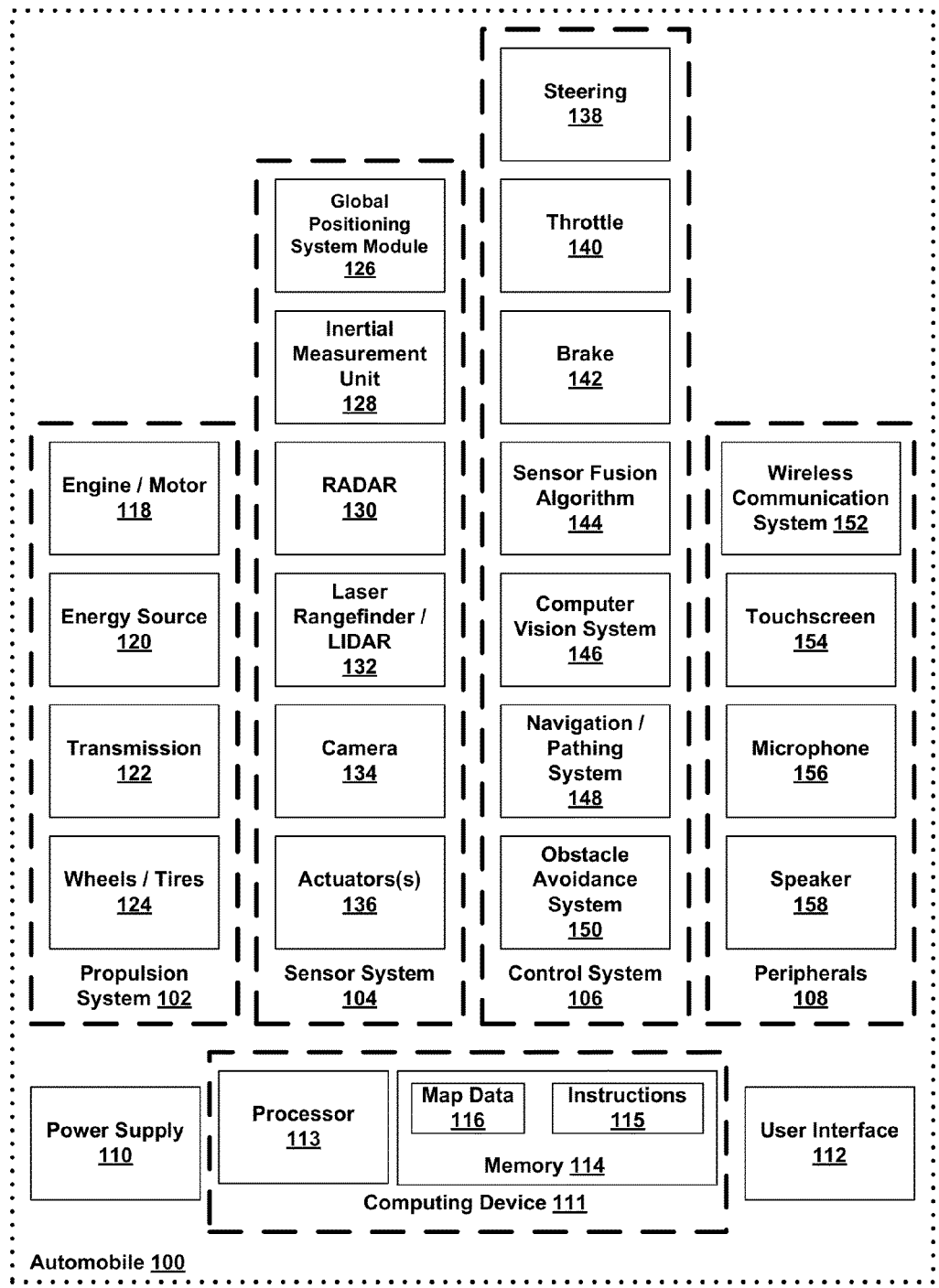
FIG. 1 is a simplified block diagram of an example automobile.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

At a given moment, human drivers can make driving decisions based on a variety of properties of a current traffic situation in the environment of the driver's vehicle, such as the positions and velocities of other cars, cyclists and pedestrians, the state of traffic lights, and human hand/arm gestures. Similar decision making may be desirable for autonomous vehicles as well. Within examples herein, methods and devices for an autonomous vehicle to detect hand signals of cyclists that are in the vicinity of the autonomous vehicle are described.

An example computing device may be configured to receive a plurality of data points corresponding to an environment of the autonomous vehicle. The plurality of data points may be obtained by one or more cameras and/or sensors. For instance, the plurality of data points may take the form of a three-dimensional (3D) point cloud obtained by laser scanners (e.g., LIDAR sensors). From the plurality of data points, the computing device may then be configured to determine one or more subsets of data points that are indicative of at least a body region of a cyclist within the vicinity of the autonomous vehicle. The body region of the cyclist may include at least an upper-body region of the cyclist, such as the head, hands, and arms of the cyclist. The one or more subsets of data points may vary depending on the posture of the cyclist and the distance and angle at which the cyclist is detected by the autonomous vehicle's sensors.

The computing device may also be configured to determine an expected adjustment of one or more of a speed of the cyclist and a direction of travel of the cyclist based on a comparison of the one or more subsets with one or more predetermined sets of cyclist signals. The one or more predetermined sets of cycling signals may include training sets of data points built from other autonomous vehicles detecting cyclists in various scenarios. For instance, each particular set of cycling signals can be classified and labeled by the computing device based on various features, such as identifying features of a cyclist (e.g., an average height of a cyclist while travelling on a road) and an activity of the cyclist that the particular set of cycling signals is associated with (e.g., whether the cyclist is providing a hand signal or not, and what type of hand signal the cyclist is providing). These "features" may take the form of labeled feature vectors which may be determined using a clustering algorithm or other type of algorithm. The labeled feature vectors can then be compared with the one or more subsets by the computing device in order to determine a probability distribution of what signal the cyclist is providing, if any signal at all. And the expected adjustment of the speed and/or direction of travel of the detected cyclist can be determined based on what signal the cyclist is providing. For instance, a detected left turn hand signal may be associated with an expected decrease in speed of the cyclist and an expected leftward steering of the cyclist.

In some embodiments, the computing device may determine (and/or make changes to) or operate according to a decision tree based on labeled feature vectors. Such a decision tree may be implemented by the computing device in order to determine how closely the one or more subsets match the one or more predetermined sets of cycling signals. The first decision of the decision tree may be, for instance, whether the environment of the vehicle includes a cyclist or not. In some embodiments, the computing device may determine a confidence score associated with each possible cyclist signal, or associated with whether there is a cyclist in the vicinity of the autonomous vehicle in general. Other classification and/or clustering algorithms are possible as well, and may include one or more supervised and unsupervised learning-based algorithms.

Lastly, the computing device may be configured to provide instructions to adjust one or more of a speed of the autonomous vehicle and a direction of travel of the autonomous vehicle based on the expected adjustment. For instance, if a cyclist travelling directly in front of the autonomous vehicle provides a slow/stop signal, the cyclist will be expected to either slow his or her speed or come to a stop, and thus the instructions may comprise a decrease in speed of the autonomous vehicle, among other possible adjustments to the autonomous vehicle.

An example vehicle control system may be implemented in or may take the form of an automobile. Alternatively, a vehicle control system may be implemented in or take the form of other vehicles, such as cars, trucks, bicycles, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Further, an example system may take the form of a non-transitory computer-readable medium, which has program instructions stored thereon that are executable by at least one processor to provide the functionality described herein. An example system may also take the form of an automobile or a subsystem of an automobile that includes such a non-transitory computer-readable medium having such program instructions stored thereon.

Referring now to the Figures, FIG. 1 is a simplified block diagram of an example automobile 100, in accordance with an example embodiment. Components coupled to or included in the automobile 100 may include a propulsion system 102, a sensor system 104, a control system 106, peripherals 108, a power supply 110, a computing device 111, and a user interface 112. The computing device 111 may include a processor 113, and a memory 114. The computing device 111 may be a controller, or part of the controller, of the automobile 100. The memory 114 may include instructions 115 executable by the processor 113, and may also store map data 116. Components of the automobile 100 may be configured to work in an interconnected fashion with each other and/or with other components coupled to respective systems. For example, the power supply 110 may provide power to all the components of the automobile 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the automobile 100 may include more, fewer, or different systems, and each system may include more, fewer, or different components. Additionally, the systems and components shown may be combined or divided in any number of ways.

The propulsion system 102 may may be configured to provide powered motion for the automobile 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the automobile 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of automobile 100 could be configured in various formats, including a unicycle, bicycle/motorcycle, tricycle, or car/truck four-wheel format. Other wheel/tire formats are possible as well, such as those including six or more wheels. The wheels/tires 124 of automobile 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the automobile 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that observe internal systems of the automobile 100 (e.g., an $O_2$ monitor, a fuel gauge, an engine oil temperature, etc.). Other sensors are possible as well.

The GPS module 126 may be any sensor configured to estimate a geographic location of the automobile 100. To this end, the GPS module 126 may include a transceiver configured to estimate a position of the automobile 100 with respect to the Earth, based on satellite-based positioning data. In an example, the computing device 111 may be configured to use the GPS module 126 in combination with the map data 116 to estimate a location of a lane boundary on road on which the automobile 100 may be travelling on. The GPS module 126 may take other forms as well.

The IMU 128 may be any combination of sensors configured to sense position and orientation changes of the automobile 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the automobile 100 is located using light. Generally, LIDAR is an optical remote sensing technology that can measure distance to, or other properties of, a target by illuminating the target with light. As an example, the LIDAR unit 132 may include a laser source and/or laser scanner configured to emit laser pulses and a detector configured to receive reflections of the laser pulses. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, The LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the automobile 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the automobile 100 illuminates an object in the environment with a predetermined light pattern, such as a grid or checkerboard pattern and uses the camera 134 to detect a reflection of the predetermined light pattern off the object. Based on distortions in the reflected light pattern, the automobile 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the automobile 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the automobile 100.

The throttle 140 may be any combination of mechanisms configured to control the operating speed and acceleration of the engine/motor 118 and, in turn, the speed and acceleration of the automobile 100.

The brake unit 142 may be any combination of mechanisms configured to decelerate the automobile 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the automobile 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the automobile 100 is located, including, for example, lane information, traffic signals and obstacles. To this end, the computer vision system 146 may use an object recognition algorithm, a Structure from Motion (SFM) algorithm, video tracing, or other computer vision techniques. In some examples, the computer vision system 146 may additionally be configured to map the environment, track objects, estimate speed of objects, etc.

The navigation and pathing system 148 may be any system configured to determine a driving path for the automobile 100. The navigation and pathing system 148 may additionally be configured to update the driving path dynamically while the automobile 100 is in operation. In some examples, the navigation and pathing system 148 may be configured to incorporate data from the sensor fusion algorithm 144, the GPS module 126, and one or more predetermined maps so as to determine the driving path for the automobile 100.

The obstacle avoidance system 150 may be any system configured to identify, evaluate, and avoid or otherwise negotiate obstacles in the environment in which the automobile 100 is located.

The control system 106 may additionally or alternatively include components other than those shown.

Peripherals 108 may be configured to allow the automobile 100 to interact with external sensors, other automobiles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other automobiles, sensors, or other entities, either directly or via a communication network. To this end, the wireless communication system 152 may include an antenna and a chipset for communicating with the other automobiles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the automobile 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the automobile 100. Similarly, the speakers 158 may be configured to output audio to the user of the automobile 100.

The peripherals 108 may additionally or alternatively include components other than those shown.

The power supply 110 may be configured to provide power to some or all of the components of the automobile 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the automobile 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various automobile functions, including any of the functions or methods described herein.

The components of the automobile 100 could be configured to work in an interconnected fashion with other components within and/or outside their respective systems. To this end, the components and systems of the automobile 100 may be communicatively linked together by a system bus, network, and/or other connection mechanism (not shown).

Further, while each of the components and systems is shown to be integrated in the automobile 100, in some examples, one or more components or systems may be removably mounted on or otherwise connected (mechanically or electrically) to the automobile 100 using wired or wireless connections.

The automobile 100 may include one or more elements in addition to or instead of those shown. For example, the automobile 100 may include one or more additional interfaces and/or power supplies. Other additional components are possible as well. In these examples, the memory 114 may further include instructions executable by the processor 113 to control and/or communicate with the additional components.

Figure 2:
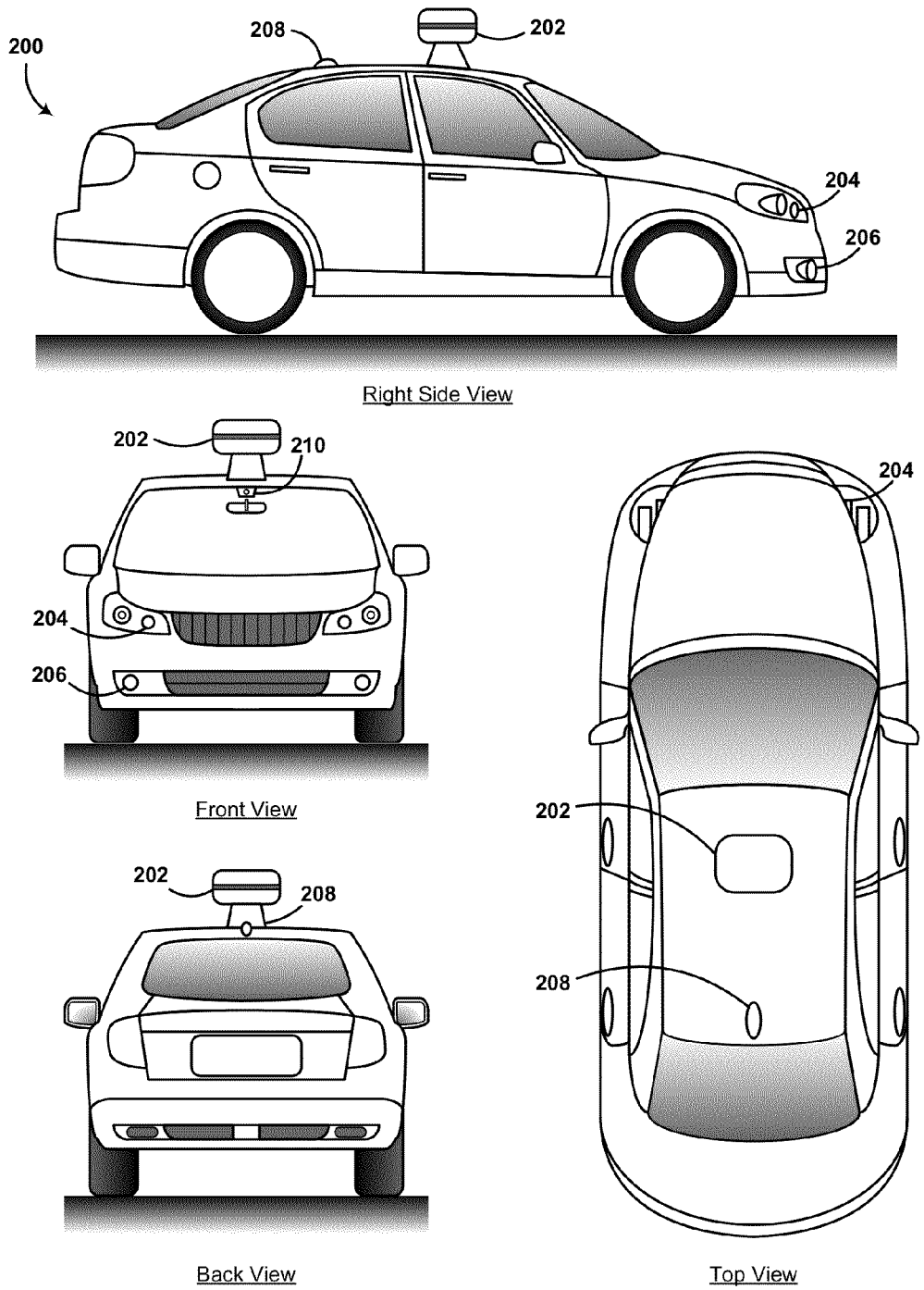
FIG. 2 illustrates an example automobile.

FIG. 2 illustrates an example automobile 200, in accordance with an embodiment. In particular, FIG. 2 shows a Right Side View, Front View, Back View, and Top View of the automobile 200. Although automobile 200 is illustrated in FIG. 2 as a car, other examples are possible. For instance, the automobile 200 could represent a truck, a van, a semi-trailer truck, a motorcycle, a golf cart, an off-road vehicle, or a farm vehicle, among other examples. As shown, the automobile 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the automobile 200, in some examples the sensor unit 202 may be mounted elsewhere on the automobile 200, either inside or outside the automobile 200. Further, while only three sensor units are shown, in some examples more or fewer sensor units may be included in the automobile 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the automobile 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other automobiles, sensors, or other entities, either directly or via a communication network as described above with respect to the wireless communication system 152 in FIG. 1. While the wireless communication system 208 is shown to be positioned on a roof of the automobile 200, in other examples the wireless communication system 208 could be located, fully or in part, elsewhere.

The camera 210 may be any camera (e.g., a still camera, a video camera, etc.) configured to capture images of the environment in which the automobile 200 is located. To this end, the camera 210 may take any of the forms described above with respect to the camera 134 in FIG. 1. While the camera 210 is shown to be mounted inside a front windshield of the automobile 200, in other examples the camera 210 may be mounted elsewhere on the automobile 200, either inside or outside the automobile 200.

The automobile 200 may include one or more other components in addition to or instead of those shown.

A control system of the automobile 200 may be configured to control the automobile 200 in accordance with a control strategy from among multiple possible control strategies. The control system may be configured to receive information from sensors coupled to the automobile 200 (on or off the automobile 200), modify the control strategy (and an associated driving behavior) based on the information, and control the automobile 200 in accordance with the modified control strategy. The control system further may be configured to observe the information received from the sensors, and continuously evaluate driving conditions; and also may be configured to modify the control strategy and driving behavior based on changes in the driving conditions.

Figure 3:
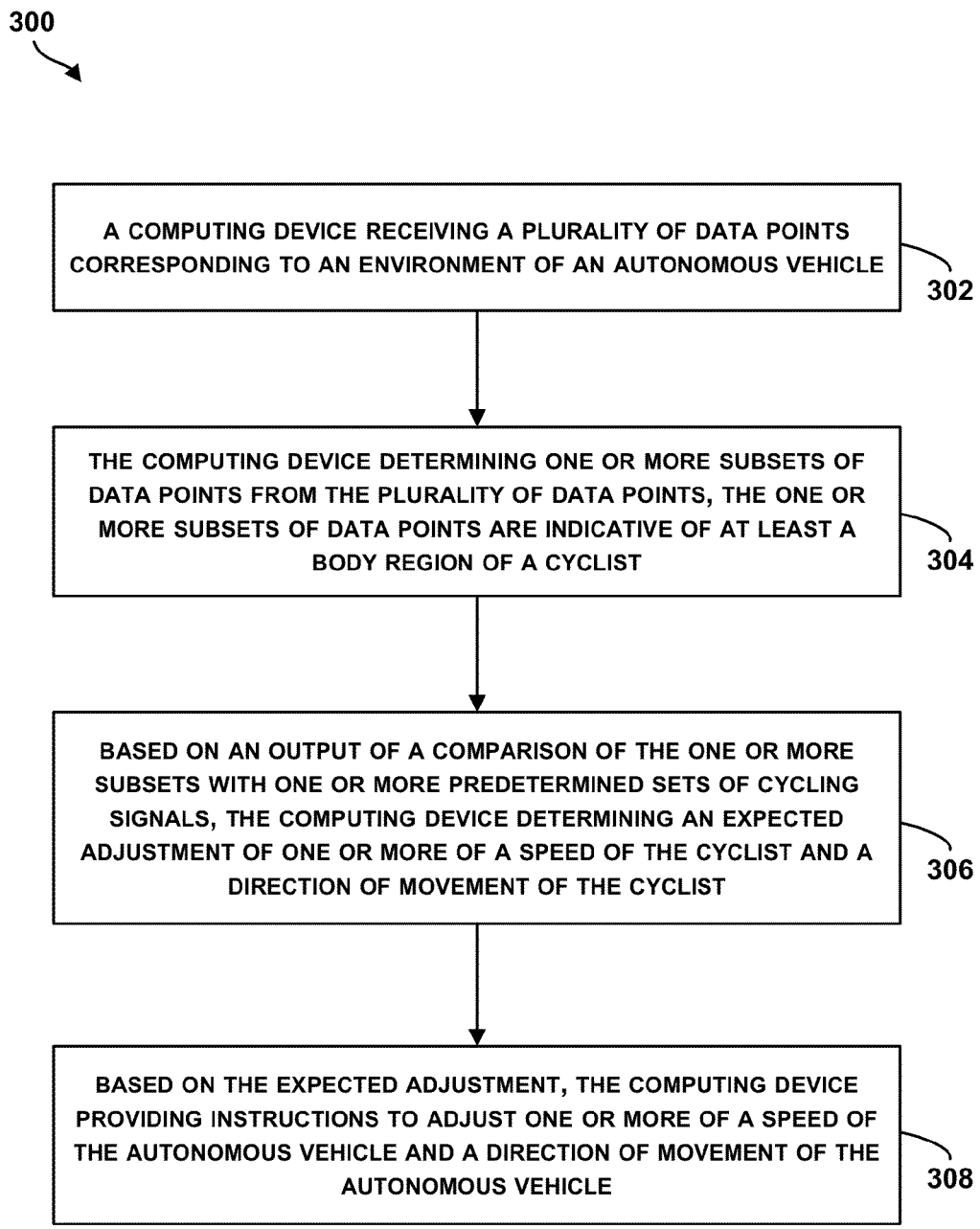
FIG. 3 is a flow chart of an example method for pulling over an autonomous vehicle.

FIG. 3 is a flow chart of an example method 300 for adjusting a speed of a vehicle. The method 300 may include one or more operations, functions, or actions as illustrated by one or more of blocks 302-308. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process. For the sake of example, the method 300 shown in FIG. 3 will be described as implemented by an example computing device, such as the computing device 111 in FIG. 1. The method 300 can also be described as implemented by an autonomous vehicle, as the computing device may be onboard the vehicle or may be off-board but in wireless communication with the vehicle. Therefore the terms "computing device" and "autonomous vehicle" can be interchangeable herein. However, in some examples, the computing device may be configured to control the vehicle in an autonomous or semi-autonomous operation mode. It should be understood that other entities or combinations of entities can implement one or more steps of the example method 300.

At block 302, the method 300 includes receiving a plurality of data points corresponding to an environment of an autonomous vehicle. As the autonomous vehicle travels, the computing device may be configured to continuously or periodically acquire data (e.g., pluralities of data points) that corresponds to the autonomous vehicle's surrounding environment.

In some scenarios, the computing device may analyze a plurality of data points in order to identify one or more objects in the autonomous vehicle's environment, such as pedestrians, traffic control objects (e.g., stop signs, traffic cones, traffic lights), construction equipment, buildings, and vehicles (e.g., cars, trucks, bicycles), among other objects, ahead of the autonomous vehicle on the road. Additionally or alternatively to identifying objects ahead of (or substantially in front of) the autonomous vehicle (e.g., in substantially the same lane as the autonomous vehicle or an adjacent lane), the computing device may be configured to identify other objects within an environment of the autonomous vehicle, including objects to the left and right of the autonomous vehicle (e.g., adjacent lanes on a road), and/or behind the autonomous vehicle, for example (e.g., such as another vehicle travelling behind the autonomous vehicle that may be ready to pass the autonomous vehicle and perhaps enter the identified region (s)). The computing device may also be configured to identify objects near and/or adjacent to the road as well, such as buildings, fire hydrants, or other objects at or beyond the road boundaries. The objects may be within one or more threshold distances from the autonomous vehicle, such as a longitudinal distance threshold from the autonomous vehicle and/or within a lateral distance threshold from the autonomous vehicle.

In addition to identifying objects, the computing device may be configured to determine respective parameters of each object. For example, the computing device may be configured to determine a type of an object or classify the object (e.g., car or truck, car or motorcycle, traffic sign or a pedestrian, etc.). Further, the computing device can determine whether the object is moving or stationary (e.g., a parked car), and a direction of movement of the object if the object is moving, such as if the object is moving towards the autonomous vehicle or away from the vehicle. Still further, the computing device may also be configured to estimate a size (e.g., width and length) and weight of the object. The computing device may also be configured to determine a transmission type (e.g., manual and automatic) and transmission mode of the object, such as whether the object is in park, drive, reverse, or neutral transmission mode. Yet still further, the computing device may be configured to determine a position of the object in a respective lane on the road or path of travel, and how close the object may be to lane boundaries. In some examples, the computing device may be configured to determine relative longitudinal speed and lateral speed of the object with respect to the autonomous vehicle. These parameters are examples, and other parameters can be determined as well.

To identify the objects and parameters of the objects, as well as other information associated with the autonomous vehicle's environment, the computing device may be configured to use the sensors and devices coupled to the autonomous vehicle, which may include sensors and modules used in the navigation and pathing system 148 in FIG. 1, as described above.

Sensor data may include data obtained, for example, from a camera, such as the camera 134 in FIG. 1 or the camera 210 in FIG. 2 or any other image-capture device, may be coupled to the autonomous vehicle and may be in communication with the computing device. The camera may be configured to capture images or a video of the path/road of travel and vicinity of the path/road of travel. The computing device may be configured to receive the images or video and identify, using image processing techniques for example, objects depicted in the image or the video. The computing device may be configured to compare portions of the images to templates of objects to identify the objects, for example.

In another example, the computing device may be configured to receive, from a LIDAR device (e.g., the LIDAR unit 132 in FIG. 1) coupled to the autonomous vehicle and in communication with the computing device, LIDAR-based information that may include a three-dimensional (3D) point cloud. The 3D point cloud may include points corresponding to light emitted from the LIDAR device and reflected from objects on the road or in the vicinity of the road.

As described with respect to the LIDAR unit 132 in FIG. 1, operation of the LIDAR device may involve an optical remote sensing technology that enables measuring properties of scattered light to find range and/or other information of a distant target. The LIDAR device, for example, may be configured to emit laser pulses as a beam, and scan the beam to generate two dimensional or three dimensional range matrices. In an example, the range matrices may be used to determine distance to an object or surface by measuring time delay between transmission of a pulse and detection of a respective reflected signal.

In examples, the LIDAR device may be configured to scan an environment surrounding the autonomous vehicle in three dimensions. In some examples, more than one LIDAR device may be coupled to the vehicle to scan a complete 360° horizon of the vehicle. The LIDAR device may be configured to provide to the computing device a cloud of point data representing obstacles or objects, which have been hit by the laser, on the road and the vicinity of the road. The points may be represented by the LIDAR device in terms of azimuth and elevation angles, in addition to range, which can be converted to (X, Y, Z) point data relative to a local coordinate frame attached to the autonomous vehicle. Additionally, the LIDAR device may be configured to provide to the computing device intensity values of the light or laser reflected off the obstacles that may be indicative of a surface type of a given object. Based on such information, the computing device may be configured to identify the objects and parameters of the objects such as type of the object, size, height, speed, whether the object is a traffic sign with a retroreflective surface, etc.

In still another example, the computing device may be configured to receive, from a RADAR device (e.g., the RADAR unit 130 in FIG. 1) coupled to the autonomous vehicle and in communication with the computing device, RADAR-based information relating to location and parameters of the objects. The RADAR device may be configured to emit radio waves and receive back the emitted radio waves that bounced off the surface of objects on the road and in the vicinity of the road. The received signals or RADAR-based information may be indicative, for example, of dimensional parameters of a given object, and may indicate whether the given object is stationary or moving.

In one example, the computing device may be configured to detect and identify the objects and parameters of the objects based on information received from multiple sources such as the image-capture device, the LIDAR device, the RADAR device, etc. However, in another example, the computing device may be configured to identify the objects based on information received from a subset of the multiple sources. For example, images captured by the image-capture device may be blurred due to a malfunction of the image-capture device, and in another example, details of the road may be obscured in the images because of fog. In these examples, the computing device may be configured to identify the objects based on information received from the LIDAR and/or RADAR units and may be configured to disregard the information received from the image-capture device.

In another example, the autonomous vehicle may be travelling in a portion of the road where some electric noise or jamming signals may cause the LIDAR device and/or RADAR device to operate incorrectly. In this case, the computing device may be configured to identify the objects based on information received from the image-capture device, and may be configured to disregard the information received from the LIDAR and/or RADAR units. In yet another example, the computing device may be configured to rank these sources of information based on a condition of the road (e.g., fog, electronic jamming, etc.). The ranking may be indicative of which device(s) to rely on or give more weight to in identifying the objects. For instance, if fog is present in a portion of the road, then the LIDAR and RADAR devices may be ranked higher than the image-based device, and information received from the LIDAR and/or RADAR devices may be given more weight than respective information received from the image-capture device.

At block 304, the method 300 includes determining one or more subsets of data points from the plurality of data points, where the one or more subsets of data points are indicative of at least a body region of a cyclist. In some examples, the one or more subsets of data points may represent groups of points of the 3D point clouds associated with regions of the autonomous vehicle's environment which may include one or more objects. For instance, one subset of data points may represent a cyclist, another subset of data points may represent a cyclist's arm, yet another subset of data points may represent a nearby stop sign ahead of the autonomous vehicle, and so on.

In some examples, the body region of the cyclist may be an upper-body region including at least one arm of the cyclist. Additionally or alternatively, in other examples, the body region may also include a head of the cyclist and/or a torso of the cyclist. Further, the computing device may be configured to determine other subsets relating to other aspects of the cyclist, such as one or more subsets indicative of a type of vehicle of the cyclist. For instance, the type of vehicle of the cyclist may include one or more types of motorcycles and/or bicycles. In some embodiments, the type of vehicle of the cyclist may include other means of transportation such as a scooter or moped. Other types of vehicles are possible as well.

In order for the computing device to determine whether the environment of the autonomous vehicle includes a cyclist and then identify at least the body region of the cyclist from the one or more subsets of data points, the computing device may first receive, from a server or other computing device, one or more predetermined sets of cycling signals. The one or more predetermined sets of cycling signals may be associated with previously-determined pluralities of data points that correspond to cyclists in the environments of other autonomous vehicles, as detected by other computing devices. In other words, the one or more predetermined sets of cycling signals may correspond to various cyclists (or an environment lacking a presence of a cyclist) previously identified in training. As such, these one or more predetermined sets of cycling signals may constitute "training data."

In some examples, the predetermined sets of cycling signals may correspond to a variety of predefined situational contexts of the other autonomous vehicles, including an environment of an autonomous vehicle which includes a cyclist, an environment of an autonomous vehicle which includes a cyclist providing a left turn hand signal, an environment of an autonomous vehicle which includes a cyclist providing a right turn hand signal, and an environment of an autonomous vehicle which includes a cyclist providing a slow/stop hand signal, among other possibilities. In addition, one or more predetermined sets of cycling signals may correspond to an environment of an autonomous vehicle that does not include a cyclist. Accordingly, with regard to the predefined situational contexts, the predetermined sets of cycling signals may include respective labels indicative of particular predefined situational contexts.

In some embodiments, the computing device may determine whether the environment of the autonomous vehicle includes a cyclist based on a comparison of a point density of the plurality of data points (e.g., various groups of points of the 3D point clouds, as noted above) with respective point densities associated with data points for the one or more predetermined sets of cycling signals. For instance, certain arrangements of points on the local coordinate frame noted above may be compared with similar arrangements of points of one or more of the predetermined sets of cycling signals that are representative of a cyclist. In some examples, each of the one or more subsets of data points from the plurality of data points may include respective point densities associated with various body regions (or combinations of body regions) of the cyclist, such as the head, hands, arms, torso, and/or legs of the cyclist.

In some examples, the one or more predetermined sets of cycling signals may include other information associated with the respective cyclists of the one or more predetermined sets of cycling signals. The computing device may then use such other information to determine whether an object in the environment of the autonomous vehicle is a cyclist. For instance, the one or more predetermined sets of cycling signals may include respective heights of one or more other cyclists previously identified and/or classified by the computing device of the autonomous vehicle and/or other computing devices of other autonomous vehicles. Additionally or alternatively, the one or more predetermined sets of cycling signals may include other parameters of the one or more other cyclists. As such, the computing device may determine the one or more subsets of data points from the plurality of data points by detecting an object in the environment of the autonomous vehicle that represents a candidate cyclist and determining a height of the object. The computing device may then compare the height of the object with the respective heights of the one or more predetermined sets of cycling signals. Then, based on an output of that comparison, the computing device may determine that the object is a given cyclist. Thus, the computing device can determine one or more subsets of data points representative of the given cyclist to be the one or more subsets of data points that are indicative of at least the body region of the cyclist.

The height of an object, such as the cyclist, represented by a point cloud (e.g., the plurality of data points) and determined by the computing device may be considered an example of a value of a feature, the feature being "height." Features can be extracted from the plurality of data points and the one or more subsets of data points and may represent other physical parameters/characteristics of the cyclist as well. Other example features may include a size and shape of the cyclist's hands, arms, head, etc., a distance from the cyclist's right hand to the cyclist's head, a distance from the cyclist's left hand to the cyclist's head, a length of the cyclist's left/ right arm, and an angle at which the cyclist's arm is bending at the elbow, among other possibilities. Further, in machine learning and pattern recognition, a vector that comprises the values of one or more features may be considered a "feature vector."

Additionally, features, such as those noted above, and feature vectors may be associated with each of the one or more predetermined sets of cycling signals. In some examples, upon receiving the one or more predetermined sets of cycling signals, the computing device may input the feature vectors into a machine learning algorithm so as to determine classes. In other words, the computing device (e.g., via the machine learning algorithm) may train itself to distinguish between sets and/or subsets of data points (e.g., clusters) that do or do not indicate the presence of a cyclist, and when a cyclist is present, that indicate what hand signal, if any, that cyclist is providing. As such, the computing device (e.g., via a classifier module) may determine classes such as: at least a portion of an environment of an autonomous vehicle which does not include a cyclist, an environment of an autonomous vehicle which includes a cyclist providing no hand signal, an environment of an autonomous vehicle which includes a cyclist providing a left turn hand signal, an environment of an autonomous vehicle which includes a cyclist providing a right turn hand signal, and an environment of an autonomous vehicle which includes a cyclist providing a slow/stop hand signal. Other classes are also possible.

In some embodiments, the computing device may include a device which may be configured to identify to which hand signal class a new plurality of data points belongs. Such a device may take the form of a classifier module, for instance. Thus, in such embodiments, the computing device may use the machine learning algorithm to train the classifier module. In other embodiments, however, other computing devices or methods, either associated with or not associated with the autonomous vehicle, may be used to train the classifier module.

Moreover, the computing device may be configured to compare newly-received data, such as the plurality of data points corresponding to the environment of the autonomous vehicle, with the training data. Once the classifier module has been trained, the computing device can analyze the plurality of data points (e.g., the one or more subsets of data points) to determine whether the plurality of data points indicates the presence of a cyclist and what hand signal, if any, the cyclist is providing.

As such, at block 306, the method 300 includes, based on an output of a comparison of the one or more subsets with one or more predetermined sets of cycling signals, the computing device determining an expected adjustment of one or more of a speed of the cyclist and a direction of movement of the cyclist. In some embodiments, the "comparison" of the one or more subsets of data points with the one or more predetermined sets of cycling signals may include a classification of the one or more subsets of data points based on the training data.

Classification may involve identifying to which of a set of classes (e.g., left or right hand signal) a new observation may belong, on the basis of a set of training data with known classes, such as the classes noted above. Classification of the one or more subsets of data points associated with the autonomous vehicle may be performed using one or more machine learning algorithms and statistical classification algorithms. Example algorithms may include linear classifiers (e.g., Fisher's linear discriminant, logistic regression, naive Bayes, and perceptron), support vector machines (e.g., least squares support vector machines), clustering algorithms (e.g., k-means clustering), quadratic classifiers, multi-class classifiers, kernel estimation (e.g., k-nearest neighbor), boosting, decision trees (e.g., random forests), neural networks, Gene Expression Programming, Bayesian networks, hidden Markov models, binary classifiers, and learning vector quantization. Other example classification algorithms are also possible.

In some examples, the process of the classification may involve the computing device determining, based on the output of the comparison of the one or more subsets with the one or more predetermined sets of cycling signals, a probability distribution (e.g., a Gaussian distribution) of possible hand signals associated with the one or more subsets. Those skilled in the art will appreciate that such a probability distribution may take the form of a discrete probability distribution, continuous probability distribution, and/or mixed continuous-discrete distributions. Other types of probability distributions are possible as well.

The probability distribution of possible hand signals may include respective probabilities assigned to each class. For example, the one or more subsets of data points may include a 70% probability that the cyclist is providing a right hand turn signal and a 30% probability that the cyclist is providing no hand turn signal. Upon determining the probability distribution of possible hand signals, the computing device may identify one or more candidate hand signals (e.g., classes) whose assigned probabilities exceed a probability threshold. The computing device may then select a hand signal from the one or more candidate hand signals. For instance, in the example just provided, the probability threshold may be 60%, and thus the computing device may select a right hand turn signal as the most likely hand signal provided by the cyclist. Other probability thresholds are possible as well. In some scenarios, multiple classes may exceed a given probability threshold, and such examples, the class with the highest assigned probability may be selected. In other scenarios, when no class exceeds a given probability threshold and/or when multiple classes are within close probabilistic proximity with one another, the computing device may determine a classification of the one or more subsets of data points to be inconclusive. Other scenarios are also possible.

In some examples, the computing device may output a confidence value associated with one or more of the classes.

Other means of determining which hand signal, if any, is being provided are possible as well.

In some embodiments, once the computing device determines a classification for the one or more subsets of data points, the computing device may store a given label associated with the determined class for the plurality of data points. The plurality of data points may then become part of the training data which may be used for future determinations of cyclists and cyclist hand signals.

The computing device may identify patterns using the machine learning algorithm to optimize cyclist hand signal detection, and/or cyclist detection in general. For instance, the machine learning algorithm may indicate that an average cyclist is about three meters tall (e.g., from the road to the top of the cyclists' head while the cyclist is moving, and/or from the road to the top of the cyclist's head while the cyclist is stationary and at least partially standing with their vehicle), a respective height of a given cyclist being a possible feature vector utilized by the computing device (e.g., by the machine learning algorithm) to identify the average cyclist height.

In some embodiments, such identified patterns (e.g., individual patterns and combinations of patterns) may be used to determine, update, and/or verify the classes. For example, if the computing device has determined using the machine learning algorithm that a cyclist averages a height of three meters tall, and the computing device has determined, based on the one or more subsets of data points, that no object in the autonomous vehicle's environment is about three meters tall, the computing device may conclude that there is no cyclist in the autonomous vehicle's environment. As another example, each of the one or more predetermined sets of cycling signals may include a respective distance from a left hand of a cyclist to a head of the cyclist and further include a respective distance from a right hand of that cyclist to the head of that cyclist. Further, after the computing device identifies a head, a left hand, a right hand, and/or arms of a potential cyclist in the environment of the autonomous vehicle, the computing device may determine a first distance from the left hand of the cyclist to the head of the cyclist and a second distance from the right hand of the cyclist to the head of the cyclist. The computing device may then compare the first and second distances with a pattern (e.g., average distance from hands-to-head) determined from the training data in order to classify the plurality of data points. For instance, a shorter distance from the cyclist's hand(s) to the cyclist's head may indicate a left or right hand turn signal, while a longer distance may indicate a slow/stop turn signal. Other example patterns are possible as well.

In some embodiments, the output of the comparison (e.g., the output of the classification) may be determined by a device configured to classify received pluralities of data points, such as the classifier module described above. Further, the output may be provided to an object tracing module, such as the RADAR unit 130. The object tracing module may be included as part of the computing device or may be a separate entity, and may be configured to determine one or more parameters of objects within the environment of the autonomous vehicle. For instance, the object tracing module may be configured to determine one or more parameters of a cyclist, such as a current speed of the cyclist, a current acceleration of the cyclist, and/or a current direction of movement of the cyclist (e.g., travelling towards the autonomous vehicle or travelling away from the autonomous vehicle). Other parameters are possible as well.

As such, based on the output of the comparison of the one or more subsets with the one or more predetermined sets of cycling signals, and further based on the one or more parameters of the cyclist determined by the object tracing module, the computing device may be configured to map the determined hand signal of the cyclist to the direction of movement of the cyclist. The computing device can then determine the expected adjustment of one or more of the cyclist's speed and direction of movement.

At block 308, the method 300 includes, based on the expected adjustment, the computing device providing instructions to adjust one or more of a speed of the autonomous vehicle and a direction of movement of the autonomous vehicle (e.g., a trajectory of the autonomous vehicle). For instance, the computing device may be configured to generally determine, based on the situational context (e.g., a cyclist's hand signal), a control strategy comprising rules for actions that control speed, steering angle, and lane of the autonomous vehicle. Further, a given control strategy (or multiple strategies) may comprise a program or computer instructions that characterize actuators controlling the autonomous vehicle (e.g., throttle, steering gear, brake, accelerator, or transmission shifter).

FIGS. 4A-4D illustrate data 400A-D (i.e., 3D point cloud data, a plurality of data points, etc.) associated with a cyclist, in accordance with the example method. Further, each of FIGS. 4A-4D is associated with respective example scenarios in which the computing device can determine an expected adjustment of the cyclist's speed and/or direction of movement. The data 400A-D is representative of respective environments of an autonomous vehicle, and FIGS. 4A-4D also include images 402A-D of the respective environments containing a cyclist.

Figure 4A:
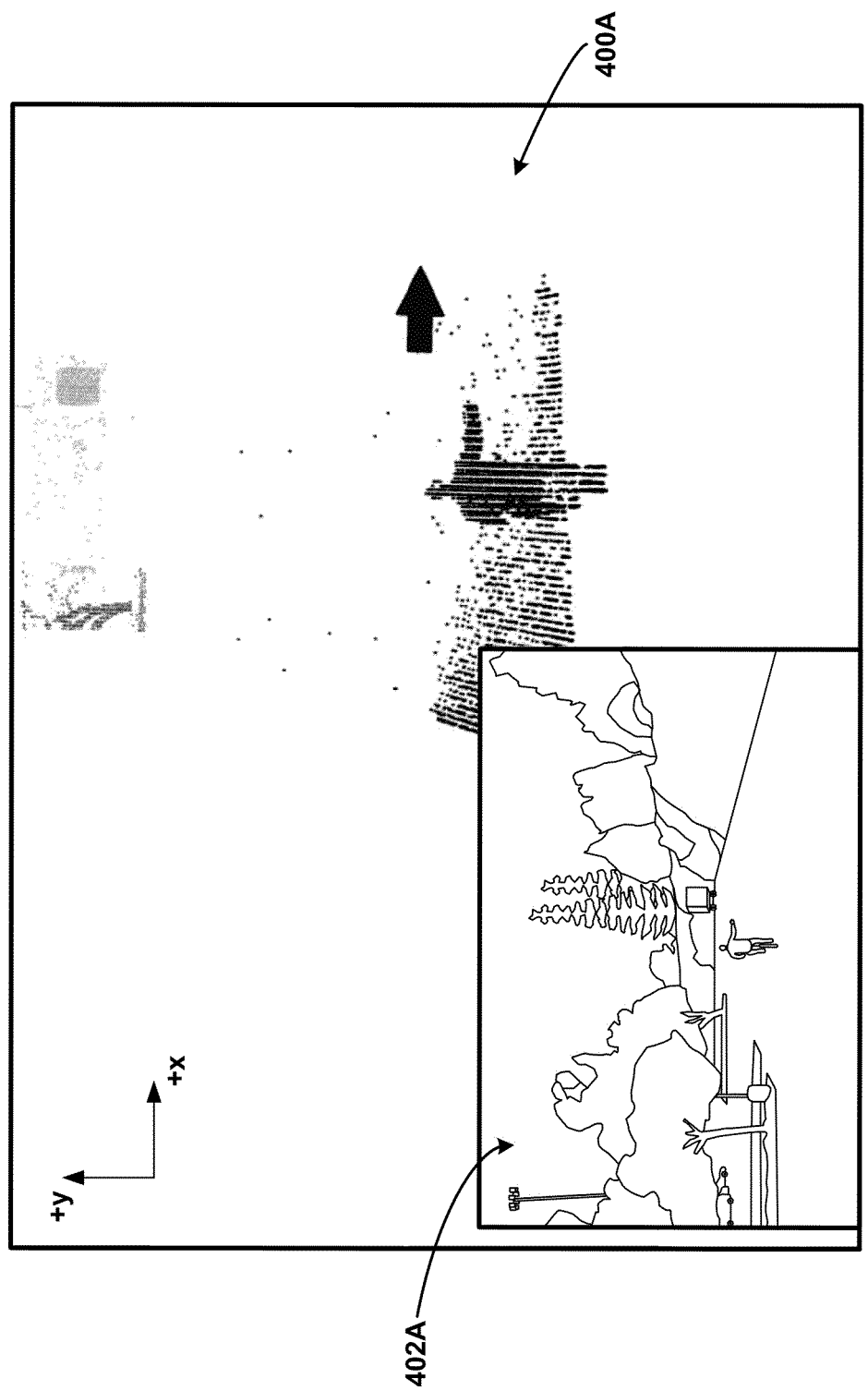
FIGS. 4A-4D illustrate example data associated with a cyclist.

As shown in FIG. 4A, the data 400A indicates a cyclist in close proximity to the autonomous vehicle with an arm of the cyclist extending in the +x direction. In some embodiments, a classifier module of the computing device configured to perform the classification/learning/etc. functions noted above may not be able to determine whether the arm of the cyclist is a right arm or a left arm. As such, the classifier module may output to the object tracing module an indication that the arm of the cyclist is extending in the +x direction. Such an output may be determined based on training data and one or more of the algorithms, techniques, and parameters described above. Further, the object tracing module may determine that the cyclist is travelling away from the autonomous vehicle, as shown in the image 402A. As such, the computing device may then determine that the arm extending in the +x direction is the right arm of the cyclist, and thereby determine that the cyclist is providing a right turn signal indicating that there will be an expected adjustment of the cyclist's speed and direction in order to for the cyclist to make a right turn. The computing device may then provide instructions to the autonomous vehicle for the autonomous vehicle to adjust its speed, trajectory, and/or other parameters accordingly.

Figure 4B:
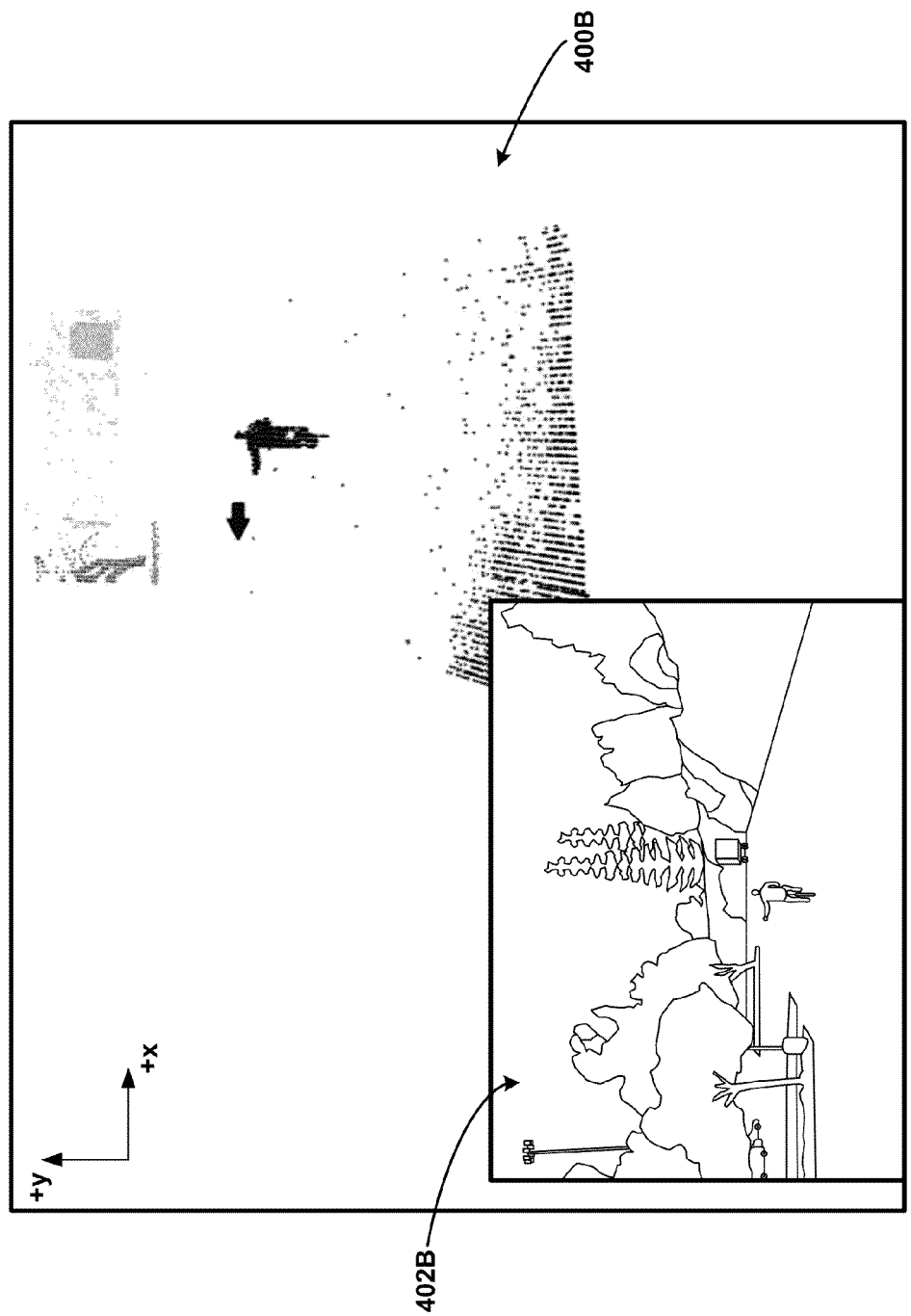

In FIG. 4B, the data 400B indicates a cyclist further in proximity from the autonomous vehicle than the cyclist in FIG. 4A and an arm of the cyclist extending in the −x direction. In this example scenario, the classifier module may output to the object tracing module an indication that the arm of the cyclist is extending in the −x direction. Further, the object tracing module may determine that the cyclist is travelling away from the autonomous vehicle, as shown in the image 402B. As such, the computing device may then determine that the arm extending in the −x direction is the left arm of the cyclist, and thereby determine that the cyclist is providing a left turn signal indicating that there will be an expected adjustment of the cyclist's speed and direction in order to for the cyclist to make a left turn.

Figure 4C:
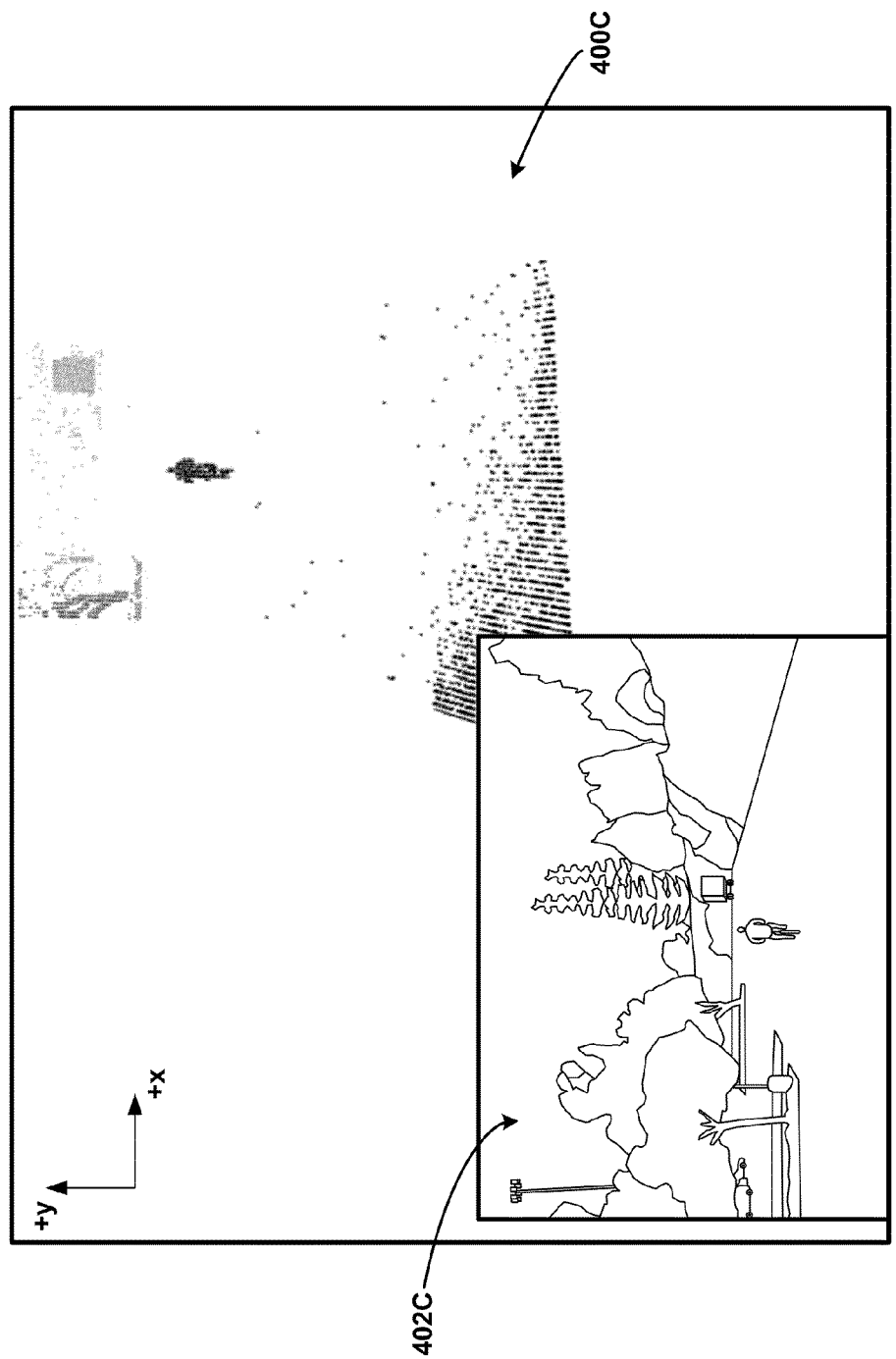

In FIG. 4C, the data 400B indicates a cyclist that is further in proximity from the autonomous vehicle than the cyclists in FIGS. 4A-B and providing no hand signal. In this example scenario, the classifier module may output to the object tracing module an indication that the cyclist is providing no hand signal. However, in some scenarios such as this, the computing device may use different patterns, measurements, classes, etc. for classifying the cyclist than the scenarios in FIGS. 4A-B. Moreover, a probability distribution associated with possible classes may include lower probabilities for left/right/slow/stop hand turn signals than the following classes: a cyclist providing no hand signal, and an environment containing no cyclist. Further, the object tracing module may determine that the cyclist is travelling away from the autonomous vehicle, as shown in the image 402C. As such, the computing device may then determine that the cyclist is indicating that there will be an expected adjustment of the cyclist's speed, but likely little to no expected adjustment of the cyclist's direction of movement.

Figure 4D:
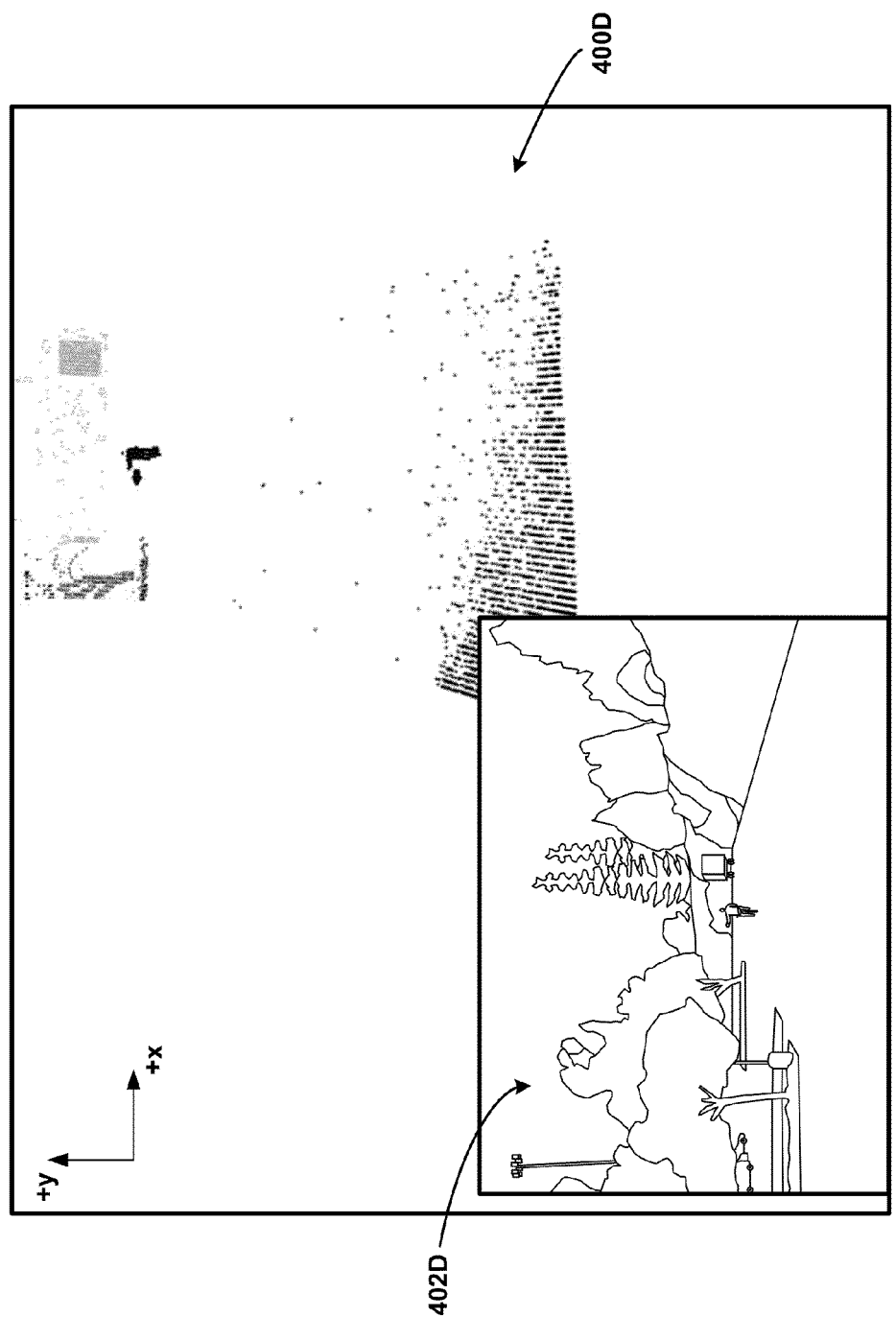

In FIG. 4D, the data 400D indicates a cyclist further in proximity from the autonomous vehicle than the cyclists in FIGS. 4A-C and an arm of the cyclist extending in the −x direction. In this scenario, like the scenario in FIG. 4B, the classifier module may output to the object tracing module an indication that the arm of the cyclist is extending in the −x direction. Further, the object tracing module may determine that the cyclist is travelling towards the autonomous vehicle, as shown in the image 402D. As such, the computing device may then determine that the arm extending in the −x direction is the right arm of the cyclist, and thereby determine that the cyclist is providing a right turn signal indicating that there will be an expected adjustment of the cyclist's speed and direction in order to for the cyclist to make a right turn (e.g., turn in the −x direction, from the autonomous vehicle's point of view). In addition to those described with respect to FIGS. 4A-D, other example scenarios are possible as well.

It should be understood that in some embodiments, at least one of the classes noted above may not correspond to whether a cyclist is giving a right hand signal or a left hand signal, but rather may correspond to whether a cyclist is extending an arm/hand in the +x or −x direction (or other direction in a 3D coordinate system). Further, in such embodiments, the object tracing module may perform functions in accordance with the classifier module in order to determine whether the cyclist is travelling in the same direction as the autonomous vehicle and intends to turn right/left, travelling in the opposite direction as the autonomous vehicle and intends to turn left/right, etc.

In some embodiments, the disclosed methods may be implemented as computer program instructions encoded on a computer-readable storage media in a machine-readable format, or on other non-transitory media or articles of manufacture. FIG. 5 is a schematic illustrating a conceptual partial view of an example computer program product 500 that includes a computer program for executing a computer process on a computing device, arranged according to at least some embodiments presented herein. In one embodiment, the example computer program product 500 is provided using a signal bearing medium 501. The signal bearing medium 501 may include one or more program instructions 502 that, when executed by one or more processors (e.g., processor 113 in the computing device 111) may provide functionality or portions of the functionality described above with respect to FIGS. 1-4D. Thus, for example, referring to the embodiments shown in FIG. 3, one or more features of blocks 302-310 may be undertaken by one or more instructions associated with the signal bearing medium 501. In addition, the program instructions 502 in FIG. 5 describe example instructions as well.

In some examples, the signal bearing medium 501 may encompass a computer-readable medium 503, such as, but not limited to, a hard disk drive, a Compact Disc (CD), a Digital Video Disk (DVD), a digital tape, memory, etc. In some implementations, the signal bearing medium 501 may encompass a computer recordable medium 504, such as, but not limited to, memory, read/write (R/W) CDs, R/W DVDs, etc. In some implementations, the signal bearing medium 501 may encompass a communications medium 505, such as, but may not limited to, a digital and/or an analog communication medium (e.g., a fiber optic cable, a waveguide, a wired communications link, a wireless communication link, etc.). Thus, for example, the signal bearing medium 501 may be conveyed by a wireless form of the communications medium 505 (e.g., a wireless communications medium conforming to the IEEE 802.11 standard or other transmission protocol).

The one or more programming instructions 502 may be, for example, computer executable and/or logic implemented instructions. In some examples, a computing device such as the computing device described with respect to FIGS. 1-4D may be configured to provide various operations, functions, or actions in response to the programming instructions 502 conveyed to the computing device by one or more of the computer readable medium 503, the computer recordable medium 504, and/or the communications medium 505. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:
   a computing device receiving a plurality of data points corresponding to an environment of an autonomous vehicle;
   the computing device determining one or more subsets of data points from the plurality of data points, wherein the one or more subsets of data points are indicative of at least a body region of a cyclist, wherein the body region of the cyclist comprises an upper-body region of the cyclist including at least one arm of the cyclist;
   based on an output of a comparison of the one or more subsets with one or more predetermined sets of cycling signals, the computing device determining an expected adjustment of one or more of a speed of the cyclist and a direction of movement of the cyclist; and
   based on the expected adjustment, the computing device providing instructions to adjust one or more of a speed of the autonomous vehicle and a direction of movement of the autonomous vehicle.

2. The method of claim 1, wherein the one or more predetermined sets of cycling signals are indicative of predefined situational contexts of other autonomous vehicles, wherein the predefined situational contexts include: an environment of an autonomous vehicle which includes a cyclist, an environment of an autonomous vehicle which includes a cyclist providing a left turn hand signal, an environment of an autonomous vehicle which includes a cyclist providing a right turn hand signal, and an environment of an autonomous vehicle which includes a cyclist providing a stop hand signal.

3. The method of claim 1, wherein determining the expected adjustment based on the output of the comparison of the one or more subsets with the one or more predetermined sets of cycling signals comprises:
  based on the output of the comparison of the one or more subsets with the one or more predetermined sets of cycling signals, determining a probability distribution of possible hand signals associated with the one or more subsets,
  identifying one or more candidate hand signals which exceed a probability threshold from the probability distribution of possible hand signals,
  selecting a hand signal from the one or more candidate hand signals, and
  determining the expected adjustment of one or more of the speed of the cyclist and the direction of movement of the cyclist based on the selected hand signal.

4. The method of claim 3, further comprising:
  determining one or more parameters of the cyclist, wherein the one or more parameters include one or more of: a current speed of the cyclist, a current acceleration of the cyclist, and a current direction of movement of the cyclist,
  wherein determining the expected adjustment of one or more of the speed of the cyclist and the direction of movement of the cyclist is further based on the one or more parameters of the cyclist.

5. The method of claim 1, wherein determining the one or more subsets indicative of at least the body region of the cyclist is based on a comparison of a point density of the plurality of data points with point densities associated with data points for the one or more predetermined sets of cycling signals.

6. The method of claim 1, further comprising:
  determining one or more subsets indicative of a type of vehicle of the cyclist,
  wherein determining the expected adjustment of one or more of the speed of the cyclist and the direction of movement of the cyclist is further based on the type of vehicle of the cyclist.

7. A non-transitory computer readable medium having stored thereon instructions that, upon execution by a computing device, cause the computing device to perform functions comprising:
  receiving a plurality of data points corresponding to an environment of an autonomous vehicle;
  determining one or more subsets of data points from the plurality of data points, wherein the one or more subsets of data points are indicative of at least a body region of a cyclist wherein the body region of the cyclist comprises an upper-body region of the cyclist including at least one arm of the cyclist;
  based on an output of a comparison of the one or more subsets with one or more predetermined sets of cycling signals, determining an expected adjustment of one or more of a speed of the cyclist and a direction of movement of the cyclist; and
  based on the expected adjustment, providing instructions to adjust one or more of a speed of the autonomous vehicle and a direction of movement of the autonomous vehicle.

8. The non-transitory computer readable medium of claim 7, wherein the computing device is a first computing device, the functions further comprising:
  receiving the one or more predetermined sets of cycling signals, wherein the one or more predetermined sets of cycling signals are associated with at least one other cyclist previously identified by a second computing device;
  determining one or more features of the one or more predetermined sets of cycling signals, wherein the one or more features are associated with a physical structure of the at least one other cyclist; and
  determining clusters of the one or more predetermined sets of cycling signals based on the one or more features.

9. The non-transitory computer readable medium of claim 8, wherein the comparison of the one or more subsets with the one or more predetermined sets of cycling signals comprises:
  determining a physical structure of the cyclist that includes the body region of the cyclist,
  making a comparison of the one or more subsets with the clusters of the one or more predetermined sets of cycling signals based on the determined one or more features of the one or more subsets, and
  based on an output of the comparison, determining a given label for the plurality of data points indicative of a situational context of the autonomous vehicle.

10. The non-transitory computer readable medium of claim 9, wherein the situational context of the autonomous vehicle includes one of: the environment of the autonomous vehicle includes the cyclist, the environment of the autonomous vehicle includes the cyclist providing a left turn hand signal, the environment of the autonomous vehicle includes the cyclist providing a right turn hand signal, or the environment of the autonomous vehicle includes the cyclist providing a stop hand signal.

11. The non-transitory computer readable medium of claim 7, wherein the computing device is a first computing device, wherein the one or more predetermined sets of cycling signals include representations of respective distances from a left hand of one or more other cyclists previously identified by a second computing device to a head of the one or more other cyclists and further include representations of respective distances from a right hand of the one or more other cyclists to the head of the one or more other cyclists, the functions further comprising:
  based on the one or more subsets, identifying a head of the cyclist, a left hand of the cyclist, and a right hand of the cyclist; and
  determining a first distance from the left hand of the cyclist to the head of the cyclist and a second distance from the right hand of the cyclist to the head of the cyclist,
  wherein the output of the comparison of the one or more subsets with the one or more predetermined sets of cycling signals is based on the first distance and the second distance.

12. The non-transitory computer readable medium of claim 7, wherein the computing device is a first computing device, wherein the one or more predetermined sets of cycling signals include respective heights of one or more other cyclists previously identified by a second computing device, and wherein determining the one or more subsets of data points from the plurality of data points comprises:

based on the plurality of data points, detecting an object in the environment of the autonomous vehicle that represents a candidate cyclist, determining a height of the object, making a comparison of the height of the object with the respective heights of the one or more predetermined sets of cycling signals, based on an output of the comparison, determining that the object is a given cyclist, and from the plurality of data points, determining one or more subsets of data points representative of the given cyclist to be the one or more subsets of data points that are indicative of at least the body region of the cyclist.

13. A system comprising:

at least one processor; and a memory having stored thereon instructions that, upon execution by the at least one processor, cause the system to perform functions comprising:

receiving a plurality of data points corresponding to an environment of an autonomous vehicle, determining one or more subsets of data points from the plurality of data points, wherein the one or more subsets of data points are indicative of at least a body region of a cyclist, wherein the body region of the cyclist comprises an upper-body region of the cyclist including at least one arm of the cyclist, based on an output of a comparison of the one or more subsets with one or more predetermined sets of cycling signals, determining an expected adjustment of one or more of a speed of the cyclist and a direction of movement of the cyclist, and based on the expected adjustment, providing instructions to adjust one or more of a speed of the autonomous vehicle and a direction of movement of the autonomous vehicle.

14. The system of claim 13, wherein determining the expected adjustment based on the output of the comparison of the one or more subsets with the one or more predetermined sets of cycling signals comprises:

based on the output of the comparison of the one or more subsets with the one or more predetermined sets of cycling signals, determining a probability distribution of possible hand signals associated with the one or more subsets, identifying one or more candidate hand signals which exceed a probability threshold from the probability distribution of possible hand signals, selecting a hand signal from the one or more candidate hand signals, and determining the expected adjustment of one or more of the speed of the cyclist and the direction of movement of the cyclist based on the selected hand signal.

15. The system of claim 14, further comprising:

an object tracing module, wherein the object tracing module is configured to determine one or more parameters of the cyclist, wherein the one or more parameters include one or more of: a current speed of the cyclist, a current acceleration of the cyclist, and a current direction of travel of the cyclist, and wherein determining the expected adjustment of one or more of the speed of the cyclist and the direction of movement of the cyclist is further based on the one or more parameters of the cyclist.

16. The system of claim 13, wherein the upper-body region of the cyclist further includes at least a portion of a torso of the cyclist and at least a portion of a head of the cyclist.

17. The system of claim 14, wherein the one or more predetermined sets of cycling signals are indicative of predefined situational contexts of other autonomous vehicles, wherein the predefined situational contexts include: an environment of an autonomous vehicle which includes a cyclist, an environment of an autonomous vehicle which includes a cyclist providing a left turn hand signal, an environment of an autonomous vehicle which includes a cyclist providing a right turn hand signal, and an environment of an autonomous vehicle which includes a cyclist providing a stop hand signal.

18. The system of claim 13, wherein the system is a first system, wherein the one or more predetermined sets of cycling signals include representations of respective distances from a left hand of one or more other cyclists previously identified by a second system to a head of the one or more other cyclists and further include representations of respective distances from a right hand of the one or more other cyclists to the head of the one or more other cyclists, the functions further comprising:

based on the one or more subsets, identifying a head of the cyclist, a left hand of the cyclist, and a right hand of the cyclist; and determining a first distance from the left hand of the cyclist to the head of the cyclist and a second distance from the right hand of the cyclist to the head of the cyclist, wherein the output of the comparison of the one or more subsets with the one or more predetermined sets of cycling signals is based on the first distance and the second distance.

19. The system of claim 13, further comprising:

a light detection and ranging (LIDAR) device coupled to the autonomous vehicle, wherein the LIDAR device is configured to provide LIDAR-based information comprising a three-dimensional (3D) point cloud that includes the plurality of data points, and wherein the plurality of data points are based on light emitted from the LIDAR device and reflected from the environment of the autonomous vehicle, the environment including the cyclist;

a camera coupled to the autonomous vehicle, wherein the camera is configured to provide one or more images of the cyclist; and a radio detection and ranging (RADAR) device coupled to the autonomous vehicle, wherein the RADAR device is configured to provide RADAR-based information relating to at least one characteristic of the cyclist.

* * * * *

UNITED STATES PATENT AND TRADEMARK OFFICE
CERTIFICATE OF CORRECTION

PATENT NO.         : 9,014,905 B1                           Page 1 of 1
APPLICATION NO.    : 14/166502
DATED              : April 21, 2015
INVENTOR(S)        : Henrik Kretzschmar and Jiajun Zhu It is certified that error appears in the above-identified patent and that said Letters Patent is hereby corrected as shown below:

In the Claims

Claim 7, Column 21, line 60, recites "a cyclist wherein the body region of the cyclist com-" whereas it should recite "a cyclist, wherein the body region of the cyclist com-"

Claim 17, Column 24, line 10, the phrase "claim 14" should read "claim 13"

Signed and Sealed this
Eighth Day of September, 2015

Michelle K. Lee
*Director of the United States Patent and Trademark Office*